T. J. SMITH & J. LEE.
Wrenches.
No. 139,622.
Patented June 3, 1873.
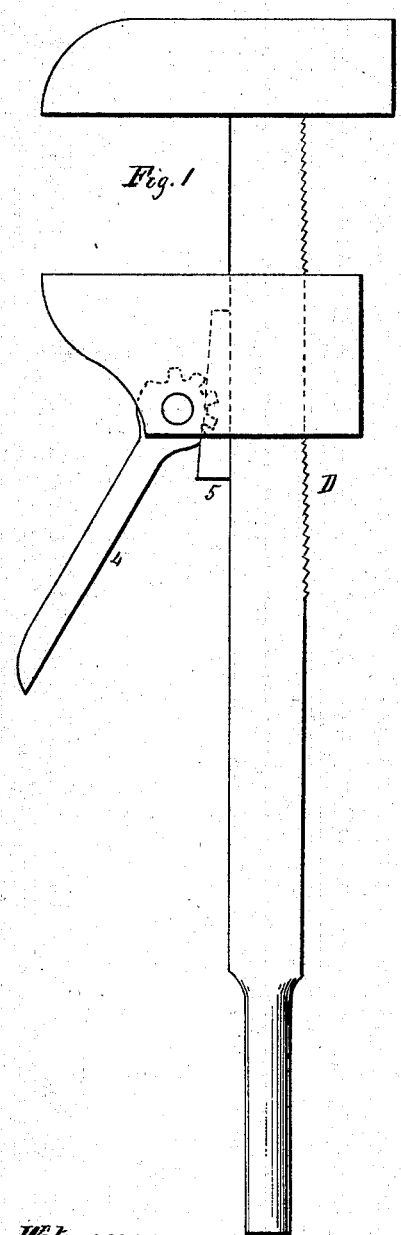
Witnesses.
Philip Doherty
Edward J. Drewer
Inventors.
Thomas J. Smith
John Lee

UNITED STATES PATENT OFFICE.

THOMAS J. SMITH AND JOHN LEE, OF ST. LOUIS, MISSOURI, ASSIGNORS OF PART INTEREST TO JOHN J. RICH AND JOHN GALLAGHER, OF SAME PLACE.

IMPROVEMENT IN WRENCHES.

Specification forming part of Letters Patent No. 139,622, dated June 3, 1873; application filed December 19, 1872.

*To all whom it may concern:*

Be it known that we, THOS. J. SMITH and JOHN LEE, of St. Louis, county of St. Louis, and State of Missouri, have invented certain new and useful Improvements in Monkey-Wrenches; and we do hereby declare that the following is a full, clear, and exact description thereof, reference being had to the accompanying drawings making a part of this, a complete specification.

The nature of our improvements is for the purpose more fully hereinafter set forth, the principal object being to make a monkey-wrench more convenient, durable, and less liable to get out of repair, dispensing entirely with the screw, as arranged in old wrench, and substituting a lever with cogs and a rack-wedge.

Figure 1 is a side view of the wrench. Fig. 2 is the movable jaw. Fig. 3 is the simple lever and cogs. Fig. 4 is the wedge with rack through which the cogs mesh, the same to be worked by lever to tighten or loosen the jaw on the wrench, as required.

B is a lever, fulcrumed in the movable jaw of the wrench, and having a cog-rack engaging a suitable rack on the outer side of the tightening-wedge C. The shank D, on the opposite side to the wedge C, is armed with teeth, which engage with similar teeth inside the movable jaw when the wedge C is forced in by the movement of the lever.

The operation of our improvement is as follows: The movable jaw is placed in the required position on the shank D, and the lever operated so as to drive in the wedge C, and force the teeth of the movable jaw to engage tightly with the teeth of the shank D, by which the movable jaw is held firmly in position.

When it is desired to change the span of the wrench, the handle of the lever is drawn outward from the shank, and the wedge thereby drawn back, which disengages the teeth of the movable jaw and shank, and the jaw may be then adjusted to the required span.

We claim as our invention—

The combination of a rack-wedge and cog-lever with a wrench having a movable jaw, substantially as described and shown.

In testimony that we claim the above-described invention, we have hereunto subscribed our names.

THOMAS J. SMITH.
JOHN LEE.

Witnesses:
PHILIP DOHERTY,
EDWARD J. DREWER.